US008983724B2

(12) United States Patent
Hauler

(10) Patent No.: US 8,983,724 B2
(45) Date of Patent: Mar. 17, 2015

(54) METHOD FOR SETTING AN ACTUATOR THAT INFLUENCES THE DRIVING DYNAMICS OF A VEHICLE

(75) Inventor: Florian Hauler, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 716 days.

(21) Appl. No.: 12/848,538

(22) Filed: Aug. 2, 2010

(65) Prior Publication Data

US 2011/0035106 A1 Feb. 10, 2011

(30) Foreign Application Priority Data

Aug. 6, 2009 (DE) .................. 10 2009 028 279

(51) Int. Cl.
*G06F 7/00* (2006.01)
*B60T 8/1755* (2006.01)
*B62D 15/02* (2006.01)

(52) U.S. Cl.
CPC ........... *B60T 8/17558* (2013.01); *B62D 15/025* (2013.01); *B62D 15/0265* (2013.01); *B60T 2260/02* (2013.01)
USPC ................................ 701/41; 701/36; 701/42

(58) Field of Classification Search
USPC ............................... 701/36, 41, 42
See application file for complete search history.

(56) References Cited

U.S. PATENT DOCUMENTS

| 6,256,584 | B1* | 7/2001 | Kodaka et al. | 701/301 |
|---|---|---|---|---|
| 7,016,783 | B2* | 3/2006 | Hac et al. | 701/301 |
| 7,983,828 | B2* | 7/2011 | Ezoe et al. | 701/78 |
| 2008/0033647 | A1 | 2/2008 | Milark et al. | |
| 2008/0172153 | A1* | 7/2008 | Ozaki et al. | 701/36 |
| 2009/0157247 | A1* | 6/2009 | Sjogren et al. | 701/23 |
| 2010/0100284 | A1* | 4/2010 | Kudo et al. | 701/42 |
| 2010/0191421 | A1* | 7/2010 | Nilsson | 701/41 |

FOREIGN PATENT DOCUMENTS

| CN | 1916991 | 2/2007 |
|---|---|---|
| CN | 101180552 | 5/2008 |
| DE | 103 42 705 | 4/2005 |
| DE | 10 2005 033087 | 1/2007 |
| DE | 10 2008 003 205 | 7/2009 |

* cited by examiner

*Primary Examiner* — Ariel Yu
(74) *Attorney, Agent, or Firm* — Kenyon & Kenyon LLP

(57) ABSTRACT

In a method for setting an actuator that influences the driving dynamics of a vehicle as a function of signals of a surround sensor system, the lateral distance of the vehicle from another vehicle is determined, and in case a minimum lateral distance is undershot, the actuator in the vehicle is actuated for the generation of a yawing moment.

20 Claims, 2 Drawing Sheets

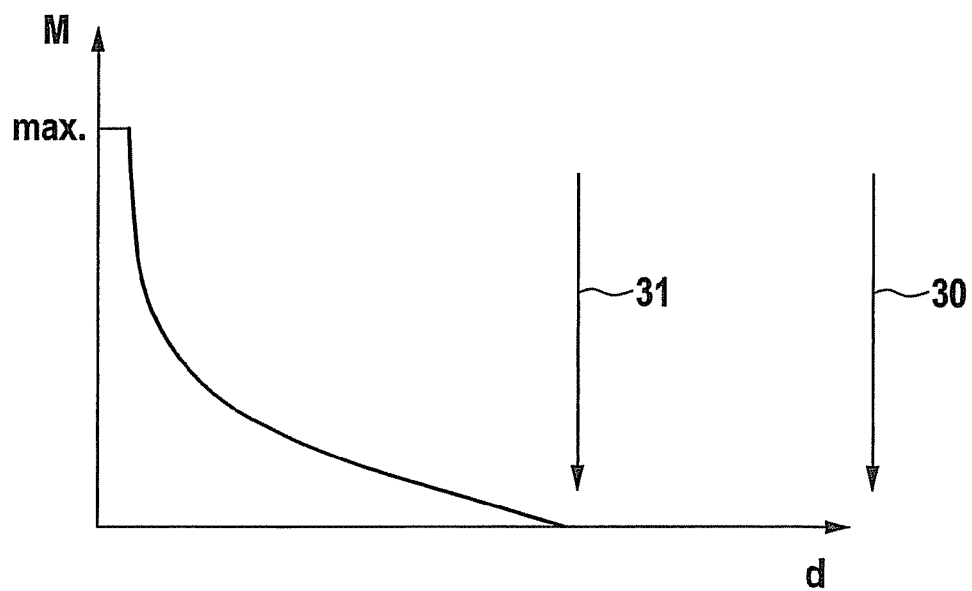

METHOD FOR SETTING AN ACTUATOR THAT INFLUENCES THE DRIVING DYNAMICS OF A VEHICLE

RELATED APPLICATION INFORMATION

The present application claims priority to and the benefit of German patent application no. 10 2009 028 279.3, which was filed in Germany on Aug. 6, 2009, the disclosure of which is incorporated herein by reference.

FIELD OF THE INVENTION

The present invention relates to a method for setting an actuator that influences the driving dynamics of a vehicle.

BACKGROUND INFORMATION

A method is discussed in German patent document DE 10 2005 033 087 A1 for avoiding ramming accidents, in which the distance from and/or the speed towards a preceding vehicle is ascertained, using a surround sensor system oriented to the near field of the vehicle and, when they fall below threshold values, an automatic intervention is made in the drive train or the vehicle brake, in order to reduce the danger of a collision.

Using the method of German patent document DE 10 2005 033 087 A1, however, the danger of collision only with a preceding vehicle can be avoided. The method is not, however, applicable to lane change maneuvers, in which there is the danger that a vehicle traveling in parallel is not detected by the driver, because of the so-called blind spot in the side mirror.

SUMMARY OF THE INVENTION

It is an object of the exemplary embodiments and/or exemplary methods of the present invention to reduce the danger of collision with vehicles traveling at least approximately parallel, in the case of a lateral approach.

The object may be attained, according to the exemplary embodiments and/or exemplary methods of the present invention, by the features described herein, and their expedient refinements as described herein.

The exemplary embodiments and/or exemplary methods of the present invention may be applied in driving situations in which two vehicles are located approximately parallel to each other and are traveling at least approximately in the same travel direction, and the vehicles are approaching each other laterally, that is, transversely to the driving direction. The lateral distance between the vehicles is ascertained using an surround field sensor system, for instance, using radar sensors, video sensors, ultrasound sensors or lidar sensors. If it is found, via the surround field sensor system, that the distance is diminishing in the transverse direction between vehicle and another vehicle or a third vehicle, and an admissible threshold value is being undershot, measures are taken to make the driver aware of the current driving situation. These measures relate to an intervention in the driving dynamics of the vehicle, the aim of the intervention being primarily to pass on information to the driver concerning the current driving situation. If necessary, however, the intervention in the driving dynamics may be used to increase driving safety in an objective manner, for instance, by moving the vehicle to a greater distance from the other vehicle by braking or by steering in the opposite direction.

Driving situations in which the method according to the present invention is applicable, refer, for example, to a lane change, in which either the vehicle, in which the method according to the present invention is being used, changes lanes, or the other vehicle changes lanes and approaches the first vehicle because of the lane change. In addition, driving situations also come into consideration in which a lane change is not intended either by the driver of one's own vehicle or by the driver of the other vehicle, but because of driving errors or other influences, such as a side wind, the transverse distance between the vehicles falls below an admissible minimum value.

According to a first aspect of the exemplary embodiments and/or exemplary methods of the present invention, when the minimum lateral distance is undershot, an actuator in the vehicle is actuated which generates a yawing moment, that is, a moment about the vehicle's vertical axis. This takes place, for example, by an automatically executed asymmetrical braking process or, provided the vehicle has an active steering system, by the automatic application of an additional steering angle that is superposed onto the steering angle that was specified by the driver. In the case of a braking process that is to be automatically carried out, the wheel brakes may be operated in such a way, for instance, that different magnitudes of braking torques are generated in the wheels in the left and the right vehicle side regions. But what also comes into consideration is the generation of differential torques using active coupling elements (torque vectoring) onto the left and right vehicle wheels, for example, a subdivision of motor-actuated braking torques via the active coupling elements to the left and right vehicle wheels. However, via such active coupling members, motor-actuated drive torques may be used by an asymmetrical subdivision to the left and the right vehicle wheels, for generating yawing moments.

Via the generating of a yawing moment, the vehicle longitudinal axis is realigned with respect to the driving direction, which is perceived in sensory fashion by the driver. The yawing moment may be generated in such a way that the vehicle tries to distance itself from the third vehicle. This also corresponds to the normal reaction of the driver, which is to distance himself from the third vehicle by an appropriate steering movement. When the intervention in the yawing moment is used, it is able to awaken in the driver the impression of a magnetic repulsion between the vehicle and the third vehicle. When there is a further approach, in order to point out to the driver the urgency of a counterreaction, it may be expedient to make the magnitude of the torque a function of the transverse distance between the vehicles, a greater torque being generated with an increasing approach, so that a reciprocal relationship between distance apart and generated torque is a given. Alternatively or in addition to the torque increase, it is also possible to design the torque curve in such a way that the urgency of the situation becomes conscious to the driver in a special manner, such as a pulsed application of the torque.

Since a vehicle deceleration also sets in, particularly in the case of a braking process for generating a yawing moment, which is not, however, desirable in every case, it may be expedient to compensate for the vehicle deceleration by an increased Cardan torque, that is effective in a Cardan shaft of the vehicle. Basically, all possibilities of raising the drive torque in the vehicle come into consideration for compensating the driving deceleration.

In case the vehicle is equipped with an active steering system, which makes possible the generation of an additional steering angle in the steering system, the yawing moment may also be generated by the application of such an additional steering angle. In this instance, by automatic actuation of the active steering system, the steerable wheels of the vehicle, steerable front wheels and/or steerable rear wheels, have the additional steering angle applied to them, which is added to the steering angle specified by the driver. The additional steering angle of the steerable wheels also leads to a rotation about the vertical axis of the vehicle and thus to a yawing moment, which is perceived by the driver. Such active steering systems include, as a rule, a bipartite steering shaft having an additional steering mechanism connected between them, via which the additional steering angle is able to be inserted into the steering system.

One influence of the vehicle, in the case of an inadmissible lateral approach between two at least approximately parallel traveling vehicles, is also made possible according to a further aspect of the exemplary embodiments and/or exemplary methods of the present invention by the generation of an additional steering torque that the driver is able to perceive in the steering wheel. If the minimum lateral clearance is undershot, a corresponding additional steering torque is generated in the steering system of the vehicle, especially in such a way that an increased resistance in the steering wheel is put in opposition to the steering motions in the direction towards the third vehicle. In this way, in case of a steering motion which is directed towards the third vehicle, the driver obtains information that points out the danger of the situation to him. By contrast, in the opposite steering direction, that is, away from the third vehicle, the steering torque is not increased; if necessary, the steering torque in this steering direction is reduced, in order to emphasize even more clearly the difference between the steering direction that is to be avoided and the one that is to be preferred.

The steering torque, in the case of an inadmissible lateral approach between the vehicle and third or other vehicle, may be generated in a steering system that is equipped with an electric servomotor for steering power support. The additional steering torque is able to be fed into the steering system via the electric servomotor.

According to a further expedient embodiment, a combination takes place of yawing moment generation and steering torque generation. This is done particularly in a stepped manner, so that in a first phase, first of all, a steering torque is generated, and in a second, subsequent phase in addition or alternatively a yawing moment is generated. Since the generation of the steering torque results in no direct change in the driving situation, but is perceived by the driver via the stopping of the steering wheel and is felt by the driver only in the case of a steering angle in the direction towards the other vehicle, the intervention in the first phases causes no impairment of comfort. Only in the second, subsequent phase a yawing moment is additionally or alternatively generated, which the driver is able to sense even without handling the steering wheel. The second phase is started especially when a further approach between the vehicles is reached. Consequently, different magnitudes of limiting distance values for the lateral distance between the vehicle and the other vehicle are assigned to the beginning of the first phase and the second phase; the first phase is started in response to a greater lateral distance, and the second phase is started in response to a lower lateral distance.

The generation of torques, that is, both the generation of a yawing moment by a braking process or a steering process, and the generation of a steering torque may be carried out even if the two vehicles are not traveling directly next to each other, but if there is an additional axial distance between the vehicle and the other vehicle, provided the axial distance falls below a threshold value. This takes into account travel situations in which another vehicle approaches at a higher speed and the driver wishes to move his own vehicle onto the lane of the approaching vehicle, in spite of the danger of a collision. As a further criterion, the speed difference between the vehicle and the other vehicle can be taken into account, upon the exceeding of a limiting speed difference, a torque being generated or a torque increase being carried out.

The torque generation takes place either continuously or discontinuously, such as in the form of individual pulses. It is basically also possible to generate the torque as a function of the lateral distance apart, in such a way, for instance, that when there is a greater lateral distance, the torque is continuously applied for comfort reasons, and with increasing approach, one goes over into a discontinuous torque generation, in order to point out to the driver the growing danger of a collision.

The falling below a minimum lateral distance between the vehicles is possibly indicated first of all via a warning signal, before a torque is generated that is able to be sensed by the driver.

Finally, it is expedient to break off the automatic torque generation, provided the driver carries out a corresponding actuation, especially an intervention to override the torque generation. In the case of a steering torque, this means that the driver steers the steering wheel going against the increased resistance that was generated in the steering wheel by the generation of the additional steering torque. In the case of a yawing torque, which is generated either by generating a braking torque or a drive torque, or by a superposed steering angle, an override is also possible, especially by operating the steering. In addition, however, other driver interventions than overriding and breaking off the additional generated torque may be valued, for instance, via an additional operation of the blinker or via operating an additional key.

The methods according to the present invention take their course in regulating devices or control devices in the vehicle, for instance, in a regulating device or a control device having an electronic stability program (ESP).

Further advantages and useful embodiments can be gathered from the further claims, the description of figures and the drawings.

BRIEF DESCRIPTION OF THE DRAWINGS

FIG. 3 shows a diagram showing the curve of a torque generated automatically in the vehicle in the case of a lateral approach of the vehicle to another vehicle.

DETAILED DESCRIPTION

Figure 1:
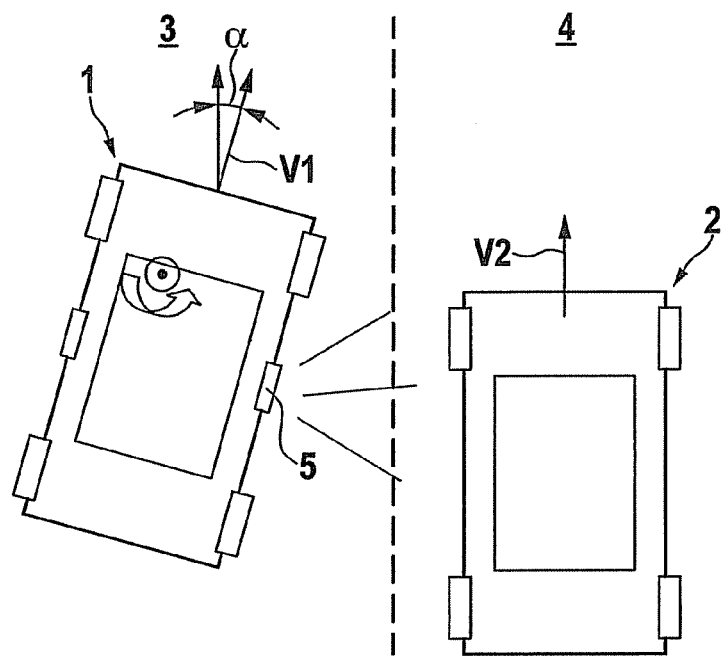
FIG. 1 shows a schematic representation of an intended lane change of a vehicle, for which a collision with another vehicle is threatening, that is traveling in parallel.

FIG. 1 shows a driving situation having a passing maneuver of a first vehicle 1, which is traveling in the left lane 3, and is passing another vehicle 2 located in right lane 4. Both vehicles 1, 2 are moving in the same travel direction, vehicle 1 has vehicle speed $v_1$ and vehicle 2 has vehicle speed $v_2$.

Vehicle 1 includes a small angle α with the direction of the road. Vehicle 1 is about to change from left lane 3 back to right lane 4. Vehicle 1 is equipped with a surround sensor system 5 which includes, for instance, radar sensors, video sensors, ultrasound sensors or lidar sensors for detecting and evaluating the driver's surround field, in order to be able to determine the course of the lane, as well as obstacles in the trajectory of the vehicle. Surround field sensor system 5 may be developed so that objects within a certain radius on all sides of the vehicle are able to be detected.

In order to prevent a collision of vehicle 1 with the other vehicle 2 during a lane change, if the driver of vehicle 1 does not notice vehicle 2, especially in the case where vehicle 2 is located in the blind spot of the rearview mirror of vehicle 1, a torque is generated in vehicle 1 in response to falling below a minimum lateral distance from other vehicle 2, which acts upon the vehicle, a vehicle component or vehicle assembly, and is able to be perceived by the driver. This torque is, for one thing, a steering torque which is generated in an electric servomotor with the aid of an EPS steering (electric power steering) and for another thing, is a yawing moment that is generated by a braking intervention at the vehicle's wheels or in the drive train, with the aid of an active coupling element for distributing of torques to the vehicle's wheels. Besides that, in the case of active steering systems, the yawing moment is also able to be generated by the generation of an additional steering angle.

Figure 2:
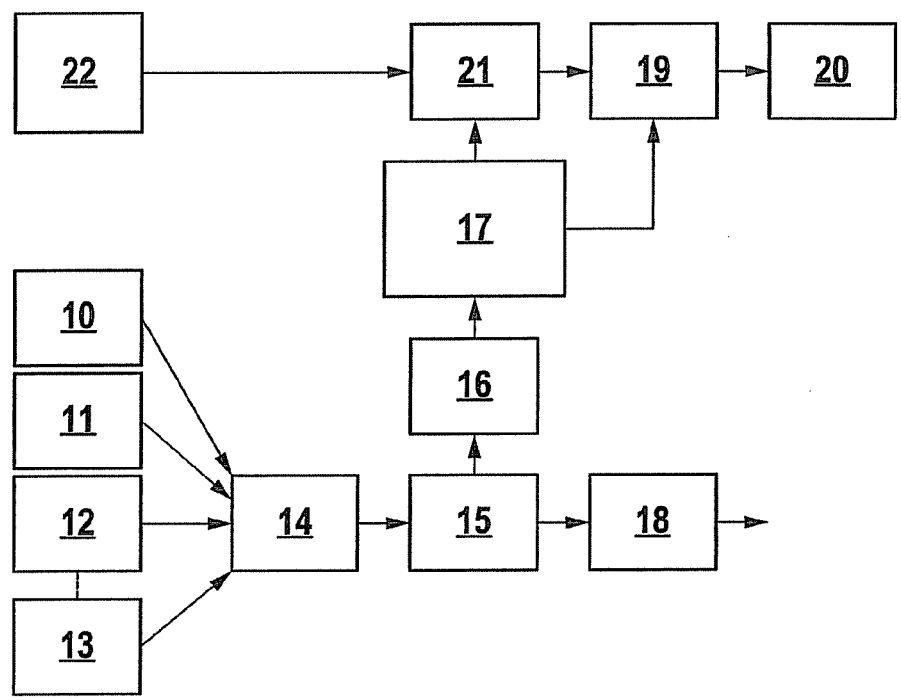
FIG. 2 shows a structural diagram having method blocks for the sequence of the method.

The performance of the method is shown in the structural diagram according to FIG. 2. First, with the aid of surround sensors 10, 11, 12, 13, which are components of the surround sensor system of the vehicle, data of the surroundings are ascertained, especially it is ascertained whether, within the detection radius of the surround sensor system, there is another vehicle. In the next block 14, there is a consolidation of the sensor data, and after that, a situation recognition is carried out in block 15. In this instance, it is determined whether another vehicle is moving at least approximately in parallel to the vehicle, which is within a minimum lateral distance that has to be undershot to start the method. An axial distance between the vehicles may also be taken into account; provided the axial distance is also within a minimum distance value, the method is carried out.

In the next block 16, a setpoint trajectory is computed, on which the vehicle should move to avoid a collision. Thereafter, in block 17, the ascertainment takes place of the vehicle torque which is either a steering torque that is generated in an electric servomotor, or it is a yawing moment which is generated either by a different braking force generation at the wheels in the left and the right vehicle side region, or by the generation of an additional steering angle in an active steering system.

Blocks 14, 15, 16 and 17 may be implemented in a regulating or control device in the vehicle.

According to one exemplary embodiment, in a first phase, first of all an additional steering torque is generated via an electric servomotor, and in a subsequent, second phase, in response to an additional lateral approach between the vehicles, additionally or alternatively a yawing moment is generated. This coupling between the different torque generations takes place via a block 18, which, in principle, represents the same method strategy as shown in FIG. 2, however, referred to the generation of a vehicle yawing moment.

Next, we shall first go into the procedure when generating an additional steering torque. This additional steering torque is computed in block 17, which leads in a subsequent block 19 to a steering torque intervention by actuating the electric servomotor of the steering system. As a result, the EPS steering system, according to block 20, has the additional steering torque applied to it that is generated in the electric servomotor of the steering system.

In a further block 21 a plausibility check takes place. Block 21 has applied to it the data on the computed steering torque from block 17, but also data on driver operation from a block 22, for instance, on the operation of the blinker, but also state variables of the vehicle, such as steering angle, steering torque, steering angle speed, etc. Provided it is determined in block 21 that the computation of the additional steering torque from block 17 does not have to be brought into correspondence with the driver operation or the state variables from block 22, for instance, based on an override by the driver, the application of the additional steering torque is broken off.

In a second, subsequent phase, in response to a further lateral approach between the vehicles, a yawing moment is generated additionally or alternatively to the additional steering torque. This takes place via the coupling in block 18, the generation of the yawing moment running basically in an analogous manner to the generation of the additional steering torque. In the generation of the yawing moment, the lateral and the axial distance between the vehicles is also determined via surround sensors 1 through 13, whereupon in block 14 there takes place a consolidation of the data ascertained by the sensors, and in block 15 the recognition and evaluation of the current driving situation. Building up on this, in block 16 a setpoint trajectory is computed for the vehicle. Subsequently, in block 17 there takes place the computation of a corresponding vehicle yawing moment which is generated according to block 19 by actuation of the wheel brakes which, according to block 20, has the effect of a corresponding braking process. The plausibility check, in turn, takes place via block 21, which balances the data from block 21 with the computation of the vehicle's yawing moment using data from block 22, from which data on a driver operation and on the current vehicle state variables are transmitted.

Alternatively to the vehicle yawing moment generation via a braking intervention according to block 19, it is also possible to generate a yawing moment by making available an additional steering angle in an active steering system.

FIG. 3 shows a characteristic curve of torque M as a function of the lateral distance d. The torque M is the additional steering torque or the yawing moment which is generated, in the case of an approach of the vehicle to another vehicle, automatically by the action of a corresponding setting device.

At a distance between the vehicle and another vehicle according to arrow 30, the two vehicles are still at such a lateral distance from each other that, at first, only a collision warning is given out in the vehicle, for instance, in an acoustic, optical or haptic manner, such as by the vibration of the steering wheel. In response to the reduction of the lateral distance, according to arrow 31, the torque generation is begun, in order to give the driver another notification of the danger of collision. Torque M rises at first continuously and approximately linearly, and in response to a further approach between the vehicles, goes over into a progressive rise. The torque is limited to a maximum value in order to give the driver the possibility of overriding the torque generation by his own operation. Thereupon the torque generation is broken off.

Basically, various different types of torque increase come into consideration. As an alternative to the abovementioned combination of an at least approximately linear and progressive rise, an exclusively linear or an exclusively nonlinear, particularly a progressive rise may be selected.

What is claimed is:

1. A method for influencing driving dynamics of a vehicle, travelling in a first lane, as a function of signals of a surround sensor system, the method comprising:
   determining, via the surround sensor system, that a second vehicle is travelling in a second lane in the same direction as, and at least partially next to, the vehicle in the first lane;

determining, via the surround sensor system, a lateral distance of the vehicle in the first lane from the second vehicle in the second lane; and executing a control that provides that:

responsive to the determined lateral distance being less than a first minimum lateral distance, a first actuator in the vehicle is operated to generate an increased resistance to steering by an operator of the vehicle toward the second vehicle, wherein the operating of the first actuator to generate the increased resistance to steering does not generate a yawing moment acting upon the vehicle; and responsive to the determined lateral distance being less than a second minimum lateral distance, a second actuator in the vehicle is operated so as to generate a yawing moment acting upon the vehicle, wherein the first minimum lateral distance is greater than the second minimum lateral distance.

2. The method of claim 1, wherein the yawing moment generated by the second actuator is implemented via an automatically executed braking process that generates magnitudes of braking torques that differ between left and right sides of the vehicle.

3. The method of claim 2, wherein a vehicle deceleration effected by operating the brake is compensated for by an increased Cardan torque, which is effective in a Cardan shaft of the vehicle.

4. The method of claim 1, wherein the yawing moment generated by the second actuator is implemented via applying an additional steering angle in an active steering system of the vehicle.

5. The method of claim 1, wherein the operating of the second actuator to generate the increased resistance to steering in the direction of the second vehicle includes generating a steering torque, which acts upon the steering wheel, in a steering system of the vehicle.

6. The method of claim 5, wherein the steering torque is generated in an electric servomotor of the steering system.

7. The method of claim 5, wherein, in a first phase, a steering torque is first generated, and wherein the yawing moment generated by the second actuator is implemented in a second and subsequent phase, in addition or alternatively to the steering torque.

8. The method of claim 7, wherein the torque is generated so that the vehicle is moved away from the other vehicle.

9. The method of claim 7, wherein the torque is generated when the other vehicle, in addition to being located at a lateral distance, is also located at an axial distance behind the vehicle, wherein the axial distance is below a threshold value.

10. The method of claim 7, wherein a quantity of the generated torque is inversely proportional to a separation distance, which is a transverse distance between the vehicle and the other vehicle.

11. The method of claim 7, wherein the generation of torque takes place continuously.

12. The method of claim 7, wherein the generation of torque takes place discontinuously and in a pulsed manner.

13. The method of claim 1, wherein a warning signal is generated in response to the undershooting of a minimum lateral distance between the vehicles.

14. The method of claim 1, wherein an automatic generation of torque is broken off if the driver performs an intervention so as to override the torque generation via an operating device.

15. The method of claim 1, wherein the yawing moment generated by the second actuator acts upon the vehicle to keep the vehicle in the first lane.

16. The method of claim 1, wherein the surround sensor system determines that the second vehicle is travelling at least partially next to the vehicle in the first lane.

17. A control device for influencing driving dynamics of a vehicle, travelling in a first lane, as a function of signals of a surround sensor system, the control device comprising:

a determining arrangement to determine that a second vehicle is travelling in a second lane in the same direction as, and at least partially next to, the vehicle in the first lane;

a determining arrangement to determine a lateral distance of the vehicle in the first lane from the second vehicle in the second lane via the surround sensor system; and an operating arrangement to execute a control that provides that:

responsive to the determined lateral distance being less than a first minimum lateral distance, a first actuator in the vehicle is operated to generate an increased resistance to steering by an operator of the vehicle toward the second vehicle, wherein the operating of the first actuator to generate the increased resistance to steering does not generate a yawing moment acting upon the vehicle; and responsive to the determined lateral distance being less than a second minimum lateral distance, a second actuator in the vehicle is operated so as to generate a yawing moment acting upon the vehicle, wherein the first minimum lateral distance is greater than the second minimum lateral distance.

18. A steering system having an electric servomotor in a vehicle, the steering system comprising:

a control device for influencing driving dynamics of the vehicle, travelling in a first lane, as a function of signals of a surround sensor system, the control device including:

a determining arrangement to determine that a second vehicle is travelling in a second lane in the same direction as, and at least partially next to, the vehicle in the first lane;

a determining arrangement to determine a lateral distance of the vehicle in the first lane from the second vehicle in the second lane via the surround sensor system; and an operating arrangement to execute a control that provides that:

responsive to the determined lateral distance being less than a first minimum lateral distance, a first actuator in the vehicle is operated to generate an increased resistance to steering by an operator of the vehicle toward the second vehicle, wherein the operating of the first actuator to generate the increased resistance to steering does not generate a yawing moment acting upon the vehicle; and responsive to the determined lateral distance being less than a second minimum lateral distance, a second actuator in the vehicle is operated so as to generate a yawing moment acting upon the vehicle, wherein the first minimum lateral distance is greater than the second minimum lateral distance.

19. An active steering system in a vehicle, comprising:

a control device for influencing driving dynamics of the vehicle, travelling in a first lane, as a function of signals of a surround sensor system, the control device including:

a determining arrangement to determine that a second vehicle is travelling in a second lane in the same direction as, and at least partially next to, the vehicle in the first lane;

a determining arrangement to determine a lateral distance of the vehicle in the first lane from the second vehicle in the second lane via the surround sensor system; and an operating arrangement to execute a control that provides that:

responsive to the determined lateral distance being less than a first minimum lateral distance, a first actuator in the vehicle is operated to generate an increased resistance to steering by an operator of the vehicle toward the second vehicle, wherein the operating of the first actuator to generate the increased resistance to steering does not generate a yawing moment acting upon the vehicle; and responsive to the determined lateral distance being less than a second minimum lateral distance, a second actuator in the vehicle is operated so as to generate a yawing moment acting upon the vehicle, wherein the first minimum lateral distance is greater than the second minimum lateral distance.

20. A braking system for individually actuating a vehicle brake, the braking system comprising:

a control device for influencing driving dynamics of a vehicle, travelling in a first lane, as a function of signals of a surround sensor system, the control device including:

a determining arrangement to determine that a second vehicle is travelling in a second lane in the same direction as, and at least partially next to, the vehicle in the first lane;

a determining arrangement to determine a lateral distance of the vehicle in the first lane from the second vehicle in the second lane via the surround sensor system; and an operating arrangement to execute a control that provides that:

responsive to the determined lateral distance being less than a first minimum lateral distance, a first actuator in the vehicle is operated to generate an increased resistance to steering by an operator of the vehicle toward the second vehicle, wherein the operating of the first actuator to generate the increased resistance to steering does not generate a yawing moment acting upon the vehicle; and responsive to the determined lateral distance being less than a second minimum lateral distance, a second actuator in the vehicle is operated so as to generate a yawing moment acting upon the vehicle, wherein the first minimum lateral distance is greater than the second minimum lateral distance.

\* \* \* \* \*